United States Patent [19]

Bohnenn

[11] Patent Number: 4,783,276

[45] Date of Patent: Nov. 8, 1988

[54] REFRIGERANT AND A MACHINE HAVING A REFRIGERATING CIRCUIT WITH REFRIGERANT

[75] Inventor: Leonardus J. M. Bohnenn, Vaassen, Netherlands

[73] Assignee: Akzo N.V., Arnhem, Netherlands

[21] Appl. No.: 139,454

[22] Filed: Dec. 30, 1987

[30] Foreign Application Priority Data

Feb. 19, 1987 [NL] Netherlands ............... 8700408

[51] Int. Cl.$^4$ .................................... C09K 5/04
[52] U.S. Cl. ............................ 252/67; 62/114
[58] Field of Search .............. 252/67; 62/112, 114

[56] References Cited

U.S. PATENT DOCUMENTS

| | | | |
|---|---|---|---|
| 2,101,993 | 12/1937 | Fleischer | 252/67 |
| 2,136,790 | 11/1938 | Fleischer | 252/69 |
| 3,948,817 | 4/1976 | Grothoff | 252/522 |

FOREIGN PATENT DOCUMENTS

697055 9/1940 Fed. Rep. of Germany .

OTHER PUBLICATIONS

W. A. Pennington, "Refrigerants", *Air Conditioning, Heating and Ventilating*, Nov. 1958, pp. 71–86.

Kirk–Othmer Encyclopedia of Chemical Technology, Third Edition, vol. 20, pp. 78–107.

W. A. Pennington et al, "The Evolution of a New Refrigerant", *Modern Refrigeration*, Jul. 20, 1950, p. 184.

*Primary Examiner*—Robert A. Wax
*Attorney, Agent, or Firm*—Parkhurst, Oliff & Berridge

[57] ABSTRACT

The invention pertains to a refrigerant containing dichlorodifluoromethane and dimethyl ether in an amount of 12–35 per cent by weight. A machine having a refrigerating circuit with such refrigerant is also claimed.

4 Claims, No Drawings

REFRIGERANT AND A MACHINE HAVING A REFRIGERATING CIRCUIT WITH REFRIGERANT

The invention relates to a refrigerant containing dichlorodifluoromethane and dimethyl ether.

Refrigerants are widely used as heat transfer fluids, i.e., they are used to absorb heat which is unwanted or superfluous in one place and they part with it in another. This process is used for instance in heat pumps, refrigeration plants such as compression refrigerating machines, refrigerators, air treatment plants, in the production and distribution of foodstuffs, and in many other applications.

In said machines the refrigerant at low temperature withdraws heat from a medium and gives it up at higher temperature to some other medium. In other words, heat is pumped to a higher temperature. In the case of heat pumps, the main point is to recover heat, for instance for the heating of a building. The main object in refrigerating plants is the withdrawal of heat, i.e., cooling.

Heat pumps and many refrigerating plants operate on the same principle, which may be described as follows. In the condenser space of a refrigerating circuit the compressor raises the pressure of the refrigerant vapour so that its saturation temperature will be slightly above the temperature of the medium to be heated (this will for instance be the ambient air around a refrigerator). The refrigerator vapour will give this heat up to this medium and condense. The condensate next expands through a valve to an evaporator space. In this space the compressor will keep the pressure so low that the saturation temperature of the refrigerant vapour will be slightly below the temperature of the medium from which heat is withdrawn (for instance the cold storage space of a refrigerator). Heat will then flow from this medium to the refrigerant, which will evaporate as the medium cools down. To keep the process cycle going the compressor must discharge the vapour from the evaporator to the condenser at a sufficient rate.

Refrigerants are also used in obtaining mechanical or electrical energy from waste heat by the organic Rankine cycle process (ORC). In that process, a refrigerant is evaporated using heat from a waste heat stream of for instance 200° C. The vapour drives a turbine and condenses at a temperature of for instance 80° C., after which the condensate is pumped back to the evaporator.

Whether a refrigerant is suitable for a specific application depends on physico-chemical and thermodynamic properties as well as on safety and availability. A description of various refrigerants and their applications is to be found in Kirk-Othmer's Encyclopaedia of Chemical Technology, third edition, Volume 20, pp. 78–107.

In actual practice only a very few fluids are found to be suitable refrigerants. By far the most widely used one is dichlorodifluoromethane (commonly referred to as R-12). R-12 is nonflammable, nontoxic, and commercially available.

In view of the rise in energy prices it is now of greater importance than it once was that the refrigerant be energy saving, i.e., that it has a high refrigeration capacity at a low input. The present invention relates to a refrigerant which may be used instead of R-12 and is energy saving. The refrigerant is composed of a mixture of R-12 and dimethyl ether (DME). That DME is suited for use as a refrigerant is known from "The Refrigerating Data Book", fifth edition ASRE, Menasha, 1946, p. 56, Table 2. Also, a refrigerant mixture of R-12 and DME is listed in Table 7 of a publication by W.A. Pennington entitled "Refrigerants" in the November issue of "Air Conditioning, Heating and Ventilating" of 1958, p. 81. In this table a number of azeotropic refrigerant mixtures are listed, including a mixture of 90% by weight of R-12 and 10% by weight of DME (90 R-12/10 DME). No further information about this refrigerant mixture is provided. However, it appears from a previous publication by the same author that DME is unsuitable for use in combination with R-12 as a refrigerant (see Modern Refrigeration, June 1950, p. 154), as its vapour pressure is only about 0.5 bar higher than that of R-12.

Research experiments have now shown that the 90 R-12/10 DME refrigerant mixture uses up almost as much energy as does R-12. Surprisingly, however, it has been found that energy consumption will decrease considerably upon even a limited increase in the amount of DME in the R-12/DME mixture and that the mixture will still be an extremely suitable refrigerant.

The invention consists in that the refrigerant of the above-described type contains DME in an amount of 12 to 35 percent by weight. The refrigerant preferably contains 12 to 16, more particularly 12 to 14 percent by weight of DME. For instance, with a refrigerant composed of 15 percent by weight of DME and 85 percent by weight of R-12 (85 R-12/15 DME) an energy saving was measured in the temperature range of 30° to 2° C. of 6% as compared with R-12 and of 5% as compared with 90 R-12/10 DME.

The flammable DME may be introduced into 100 parts by weight of the nonflammable R-12 in an amount of up to 15,3 parts by weight without a flammable gas mixture being formed upon evaporation. Provided that safety regulations are observed the refrigerant according to the invention may contain up to 35% by weight of DME. The upper limit of 35 percent by weight is governed by an energy consumption which is about equal to that for R-12.

Optionally, the refrigerant may also contain small amounts of other usual refrigerant fluids.

An embodiment of the invention consists of a machine having a closed-cycle refrigeration circuit filled with the refrigerant according to the invention. Examples of such machines include domestic refrigerators and freezers, refrigerated display cases in sales rooms, high-capacity compressor systems for stationary refrigeration and refrigerated traffic, and air conditioning plants, e.g., for buildings and vehicles.

The partial replacement of R-12 by DME has other advantages in addition to saving energy.

Since the mid 1970s it has been known that R-12, in common with certain other fully fluorinated hydrocarbons, will sooner or later pass from the atmosphere into the stratosphere and attack the ozone layer. The ozone layer acts as a shield that partially blocks solar ultraviolet radiation by absorbing it. Hence, a weakening of the ozone layer will result in an increase in ultraviolet radiation on earth. This may have unfavourable consequences for man, flora and fauna. Therefore, investigations have been made into finding ways of restricting the use of R-12. The present refrigerant has the advantage of containing less R-12.

In common with R-12, DME is chemically stable, has low toxicity, and is not corrosive. Pure DME does not form peroxides or bischloromethyl ether with R-12 at elevated compressor temperature (125° C.), and does not attack ozone. R-12 and DME are miscible in any ratio.

The DME in the present refrigerant will dissolve sludge (a reaction product of R-12 and compressor oil) and traces of free water and ice in the refrigerating circuit and thus prevent the plant from breaking down as a result of freezing up of expansion valves and/or filters. Up to now it has often been practice for methanol to be added to R-12 to restrain the formation of ice (see Kalton-Pocket Manual from Kali Chemie AG Hannover, 1978, p. 65). However, methanol may promote corrosion and, unlike DME, does not contribute to the refrigeration capacity.

According to a preferred embodiment of the invention the refrigerant contains 15 percent by weight of DME. The various advantages of using DME are best combined in this way. For instance, the 85 R-12/15 DME refrigerant mixture is energy-saving, contains about 25 percent by volume less R-12 than the usual refrigerant R-12, and the formation of ice-crystals in the refrigeration circuit is excluded.

EXAMPLES

The refrigerants R-12, 90 R-12/10 DME, 87 R-12/13 DME and 85 R-12/15 DME were tested in a refrigeration plant provided with a dryer. A description of this system and its operation are given below.

The refrigerant is passed through an expansion valve to an evaporator, where it will evaporate while absorbing heat. The vapour is sucked in by the compressor, compressed in a condenser, and condenses, releasing heat. The compressor used is an electrically driven 4-cylinder open compressor of the trademark Worthington. The evaporator and the condenser are "shell and tube" type heat exchangers, trademark Helpman. Water cooling in the condenser is regulated by an electronically controlled valve. The expansion valve is also electronically controlled. The plant is equipped with a high and low pressure pressure switch and an oil differential pressure pressure switch. The temperature desired in the evaporator is maintained by means of a thermostatted water/glycol stream.

The plant contains the necessary equipment for measuring the refrigeration capacity and the input of the compressor. The quotient of refrigeration capacity and input is the coefficient of performance. This is a measure of energy consumption.

The refrigerants were tested in the plant at a condensation temperature of 30° C. and evaporation temperatures of +2° C. (common in refrigerators and air treatment systems) and −10° C. (freezer compartment temperature).

In Table I are listed the measured values for refrigeration capacity, input, and coefficient of performance. Table II gives the increase in refrigeration capacity and decrease of power consumption (i.e., an increase in coefficient of performance) for 90 R-12/10 DME and 85 R-12/15 DME as compared with R-12. Table II shows that the addition of DME results in an increase in refrigeration capacity, and that the energy consumption of the mixtures 87 R-12/13 DME and 85 R-12/15 DME mixture is substantially lower than that of R-12 and 90 R-12/10 DME. The decrease is largest in the temperature range of 30° C.–2° C. The refrigerant according to the invention is therefore particularly suited to be used in refrigerators, air treatment plants, and heat pumps.

Tests in actual practice have shown that the refrigerants 87 R-12/13 DME and 67 R-12/33 DME could be made use of with advantage and without any problems in domestic refrigerators. When use is made of the mixture 67 R-12/33 DME, the required fire safety regulations must be observed.

TABLE I

| refrigerant | R-12 | 90 R-12/ 10 DME | 85 R-12/ 15 DME | 87 R-12/13 DME |
|---|---|---|---|---|
| evaporation temperature 2° C. | | | | |
| refrigeration capacity (kW) | 48,21 | — | 52,28 | 50,79 |
| input (kW) | 9,18 | — | 9,39 | 9,42 |
| coefficient of performance | 5,25 | 5,29 | 5,56 | 5,38 |
| evaporation temperature −10° C. | | | | |
| refrigeration capacity (kW) | 29,12 | — | 31,59 | 31,17 |
| input (kW) | 8,44 | — | 8,80 | 8,88 |
| coefficient of performance | 3,45 | 3,50 | 3,59 | 3,51 |

TABLE II

| refrigerant | 90 R-12/ 10 DME versus R-12 | 85 R-12/ 15 DME versus R-12 | 87 R-12/13 DME versus R-12 |
|---|---|---|---|
| evaporation temperature 2° C. | | | |
| energy consumption | −0,8% | −5,9% | −4,7% |
| refrigeration capacity | — | +8,5% | +5,6% |
| evaporation temperature −10° C.: | | | |
| energy consumption | −1,6% | −4,1% | −3,5% |
| refrigeration capacity | — | +8,5% | +7,1% |

I claim:

1. A refrigerant containing dichlorodifluoromethane and dimethyl ether, characterized in that the amount of dimethyl ether in the refrigerant is 12 to 35 percent by weight.

2. A refrigerant according to claim 1, characterized in that the amount of dimethyl ether is 12 to 16 percent by weight.

3. A refrigerant according to claim 2, characterized in that the amount of dimethyl ether is 12 to 14 percent by weight.

4. A machine having a refrigerating circuit with refrigerant, characterized in that the refrigerant has a composition according to claim 1.

* * * * *

UNITED STATES PATENT AND TRADEMARK OFFICE
CERTIFICATE OF CORRECTION

PATENT NO. : 4,783,276

DATED : November 8, 1988

INVENTOR(S) : Leonardus J. M. BOHNENN

It is certified that error appears in the above-identified patent and that said Letters Patent is hereby corrected as shown below:

Column 2, line 37, change "15,3" to 15.3--.

Column 4, Table I, change all commas to periods.

Column 4, Table II, change all commas to periods.

Signed and Sealed this

Fifth Day of September, 1989

Attest:

DONALD J. QUIGG

Attesting Officer

Commissioner of Patents and Trademarks